Patented Sept. 16, 1930

1,776,088

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER FABRIK GESELLSCHAFT MIT BESCHRANKTER HAFTUNG, OF DUSSELDORF-OBERKASSEL, GERMANY

PROCESS FOR MAKING INACTIVE MENTHOL

No Drawing. Application filed June 30, 1927, Serial No. 202,739, and in Germany February 15, 1927.

The present invention refers to the process for manufacturing inactive menthol the racemate of natural menthol from liquid menthols mixtures. Such liquid menthols mixtures may be obtained for example by hydrogenation of thymol or inactive menthone and isomenthone by means of hydrogen under pressure in the presence of hydrogenating catalysts and by separating the product of hydrogenation into the liquid menthols mixture as first fraction with the lowest boiling-point and into crystallized inactive menthol as medium fraction and into solid inactive isomenthol as third fraction by means of fractional distillation. Liquid menthols mixtures may also be obtained by catalytic isomerization of the isomers of inactive menthol by hydrogenating catalysts or alkaline metal mentholates or by means of a mentholate of the earth alkaline metals as barium, strontium, calcium, magnesium, aluminum and separating the isomerization product by means of fractional distillation (see U. S. Patent No. 1,625,771 of April 19th, 1927, U. S. Patent No. 1,629,002, our copending applications, Serial Number 118,834, filed June 26th, 1926, Serial Number 146,564, filed November 5th, 1926, and the applications executed at the same date as the present application).

The present process consists in subjecting the above mentioned liquid menthols mixtures to a freezing operation. Hereby inactive neomenthol is precipitated from the liquid constituent and is separated from the liquid which contains inactive menthol by any method in which liquids may be separated from solids, for instance by decantation or centrifuging. The freezing is best performed after previous introduction of a crystal of inactive neomenthol obtained in a previous operation or after a known process. The inactive neomenthol obtained according to the present process has a melting-point of 51–52 degrees centigrade and excels by good crystallizing properties. The melting-point of its acid phthalate (obtained as described in our copending application 146,564, filed November 5th, 1926, for inactive menthol in using under the same conditions inactive neomenthol in the place of inactive menthol) is 177 degrees centigrade, that of its paranitrobenzoate 80 degrees centigrade. The inactive neomenthol was first prepared and described by Pickard and Littlebury (see Journal of the Chemical Society, Volume 101, page 109 (1912) and afterwards by Zeitschel and Schmidt (see Berichte der Deutschen Chemischen Gesellschaft, Volume 59, page 2298 (1926).) The separation of the crystallized inactive neomenthol from the liquid menthols mixtures obtained in the manufacture of inactive menthol by hydrogenation or isomerization was hitherto unknown and therefore one could not predict the possibility of its preparation out of the liquid menthols mixtures. From the liquid constituent remaining from the separation of inactive neomenthol, another part of inactive menthol may be recovered by fractional distillation. By the previous separation of the crystallized inactive neomenthol the liquid mixture has become richer in inactive menthol which fact makes the separation of inactive menthol materially simpler than is the case before the freezing out of inactive neomenthol. It is preferable to add fresh hydrogenation or isomerization products, obtained for instance by the above cited processes, to the liquid constituent separated from inactive neomenthol and then subject the new mixture to the fractional distillation for the recovery of inactive menthol.

Another feature of the present invention is the separation of a hitherto unknown isomer of the inactive menthol, which is designated hereafter as "inactive neo-isomenthol", for it is an alcohol of the inactive isomenthone, the semicarbazone of the latter having the melting-point of 217 degrees centigrade. The inactive neo-isomenthol is a liquid at normal temperature, and has a melting-point of about 12–14 degrees centigrade and a boiling-point of 214.5 degrees centigrade at 760 mm. pressure, and is further characterized by its acid phthalate melting at 90–92 degrees centigrade and by its paranitrobenzoate melting at 56 degrees centigrade.

The separation of inactive neo-isomenthol consists in subjecting the hydrogenation products of thymol (or inactive isomenthone)

obtained by hydrogenation preferably at temperatures of about 120–160 degrees centigrade with hydrogenating catalysts and hydrogen under pressure, to a fractional distillation, freezing out inactive neomenthol from the liquid menthols mixtures as above mentioned, and subjecting the liquid constituent remaining after the separation of inactive neomenthol to a fractional distillation, and separating the fraction boiling at about 212.3 degrees centigrade at 760 mm. pressure, containing inactive neomenthol and the fraction boiling at about 214.5 degrees centigrade at 760 mm. pressure, containing inactive neo-isomenthol and the fraction boiling at about 216.5 degrees centigrade, containing inactive menthol. The inactive neo-isomenthol may be obtained if desired in a pure condition by forming the acid phthalate or paranitrobenzoate, crystallizing the esters and saponifying the pure esters.

The separation of the inactive neomenthol, as well as of the inactive neo-isomenthol, from liquid menthols mixtures produces an increased yield of inactive menthol by the separation process itself.

The crude inactive menthol which is obtained according to the processes described may be purified by converting it into the esters or into the acid esters, for example the ester of the paranitrobenzoic acid or the carbonate, borate, acid phthalate or acid succinate of the inactive menthol, crystallizing the ester and then saponifying the pure ester or acid ester as described in the copending application Serial Number 146,564, filed November 5th, 1926.

*Example 1.*—485 kilogrammes of thymol or 495 kilogrammes of inactive menthone or isomenthone are treated, with 10 kilogrammes of nickel catalyst, with hydrogen at a pressure of about 10 to 30 atmospheres at 180 degrees centigrade in an autoclave with agitation until the hydrogenation product exhibits a maximum of inactive menthol (period about 24 hours, melting-point of the hydrogenation product about 15 degrees centigrade). After separation from the catalyst about 500 kilogrammes of hydrogenation product are obtained which are separated by fractional distillation into the following constituents:

1. 200 kilogrammes of liquid menthols mixture, about 70–80% inactive neomenthol.
2. 250 kilogrammes of crude about 80–90% inactive menthol.
3. 50 kilogrammes of crude about 80–90% inactive solid isomenthol (melting point 53 degrees centigrade).

200 kilogrammes of the liquid mixture (1), containing considerable inactive neomenthol, are treated with a crystal of inactive neomenthol, and frozen at about 0 degrees centigrade to +10 degrees centigrade. By centrifuging the separated crystals 120–130 kilogrammes of practically pure inactive neomenthol are obtained. Completely pure inactive neomenthol may be obtained by recrystallization from alcohol. The resulting 70 to 80 kilogrammes of liquid mixture contains about 40–50 kilogrammes of inactive menthol and is fractionated anew with fresh hydrogenation product.

The crude inactive menthol of the second fraction is further purified by way of the crystallized esters.

*Example 2.*—485 kilogrammes of thymol are treated, with 10 kilogrammes of nickel catalyst, with hydrogen at a pressure of about 10–30 atmospheres at 140 degrees centigrade in an autoclave with agitation, during about 24 hours. After separation from the catalyst 500 kilogrammes of hydrogenation product are obtained which are separated by fractional distillation into the following constituents:

1. 200 kilogrammes of liquid menthol mixture containing about 50% inactive neomenthol and about 20–30% inactive neo-isomenthol.
2. 200 kilogrammes of crude about 80–90% inactive menthol.
3. 100 kilogrammes of crude about 80–90% inactive solid isomenthol (melting-point 53 degrees centigrade).

In the portion remaining consisting of 140–150 kilogrammes of liquid, are gathered practically all the assembled neo-isomenthol. Through repeated fractional distillation and refrigeration of the neomenthol, one can obtain 40–50 kilogrammes containing a high percentage of inactive neo-isomenthol together with further masses of neomenthol and inactive menthols. The purification of the inactive menthol is done according to the process of U. S. application, No. 146,564.

We claim:

1. The process for manufacturing inactive menthol, the racemate of natural menthol, which consists in subjecting to a freezing operation liquid menthol mixtures resulting from the fractional distillation of synthetic menthol mixtures as first fraction thereof, separating the deposited solid inactive neomenthol, subjecting the liquid menthol mixtures, after inactive neomenthol has been separated, to fresh fractional distillation, and collecting a fraction boiling at about 216.5° C. at a pressure of 760 mm., containing inactive menthol.

2. The process for manufacturing inactive menthol, the racemate of natural menthol, which consists in subjecting to a freezing operation liquid menthol mixtures resulting from the fractional distillation of synthetic menthol mixtures as first fraction thereof, separating the deposited solid inactive neomenthol, adding the liquid menthol mixtures, after inactive neomenthol has been separated, to further quantities of synthetic menthol mixture, subjecting the new mixture to fresh fractional distillation, and collecting a fraction boiling at about 216.5° C. at a pressure of 760 mm., containing inactive menthol.

3. The process for manufacturing inactive menthol, the racemate of natural menthol, which consists in subjecting to a freezing operation the liquid menthol mixtures resulting from the fractional distillation of synthetic menthol mixtures as first fraction thereof, separating the deposited solid inactive neomenthol, subjecting the liquid menthol mixtures, after inactive neomenthol has been separated, to fresh fractional distillation, fractionating three fractions, the one, boiling at about 212.3° C. at 760 mm. pressure containing inactive neomenthol, the second, boiling at about 214.5° C. at 760 mm. pressure containing inactive neo-isomenthol, the third, boiling at about 216.5° C. at 760 mm. pressure containing inactive menthol, converting the obtained crude inactive menthol into an ester, purifying the said ester of inactive menthol by crystallization and saponifying the purified ester of inactive menthol.

In testimony whereof we hereunto affix our signatures.

KARL SCHÖLLKOPF.
ARTHUR SERINI.